US007413338B2

United States Patent
Pan

(10) Patent No.: US 7,413,338 B2
(45) Date of Patent: Aug. 19, 2008

(54) BACKLIGHT MODULE WITH NOISE DAMPING PROTRUSION AND LIQUID CRYSTAL DISPLAY WITH SAME

(75) Inventor: Chun-Yun Pan, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/500,528

(22) Filed: Aug. 8, 2006

(65) Prior Publication Data
US 2007/0030700 A1 Feb. 8, 2007

(30) Foreign Application Priority Data
Aug. 8, 2005 (TW) .............................. 94126748 A

(51) Int. Cl.
*F21V 7/04* (2006.01)
(52) U.S. Cl. .................. 362/633; 362/632; 362/634

(58) Field of Classification Search ......... 362/632–634; 349/58
See application file for complete search history.

(56) References Cited

U.S. PATENT DOCUMENTS

| 6,392,724 | B2 * | 5/2002 | An et al. ................... 349/58 |
| 6,609,808 | B2 | 8/2003 | Chen |
| 6,812,976 | B2 * | 11/2004 | Satonaka ................... 349/58 |
| 7,237,941 | B2 * | 7/2007 | Hsieh et al. ................ 362/633 |

* cited by examiner

*Primary Examiner*—Anabel M Ton
(74) *Attorney, Agent, or Firm*—Wei Te Chung

(57) ABSTRACT

An exemplary backlight module includes a frame (16) and a light guide plate (14) positioned in the frame. The frame defines a notch (164), which notch is bounded by a wall of the frame. The light guide plate includes a side surface (141), and an ear (144) extending from the side surface. The ear is received in the notch. A first protrusion (165) protrudes from either the wall of the notch or the ear and contacts the corresponding ear or wall of the notch.

10 Claims, 5 Drawing Sheets

BACKLIGHT MODULE WITH NOISE DAMPING PROTRUSION AND LIQUID CRYSTAL DISPLAY WITH SAME

FIELD OF THE INVENTION

The present invention relates to backlight modules and liquid crystal displays (LCDs) that include backlight modules, and more particularly to backlight modules configured to avoid being noisy.

GENERAL BACKGROUND

Liquid crystal displays are commonly used as display devices for compact electronic apparatuses, because they not only provide good quality images with little power but are also very thin. The liquid crystal molecules in a liquid crystal display device do not emit any light themselves. The liquid crystal molecules have to be lit by a light source so as to clearly and sharply display text and images. Thus, a backlight module is generally needed for a liquid crystal display.

In a typical such liquid crystal display, the backlight module includes a plastic frame and a light guide plate positioned in the plastic frame. The light guide plate includes a plurality of ears integrally extending from a side surface thereof. The ears are respectively received in a plurality of notches of the plastic frame. Contact portions of the ears of the light guide plate and of walls that bound the notches of the plastic frame are generally planar surfaces. The contact portions of the ears and the notch walls are liable to rub against each other when the liquid crystal display is subjected to vibration or shock during operation or transportation. When this friction occurs, the liquid crystal display is liable to be noisy.

What is needed, therefore, is a backlight module that can overcome the above-described deficiencies. What is also need is a liquid crystal display employing such a backlight module.

SUMMARY

In a preferred embodiment, a backlight module includes a frame and a light guide plate positioned in the frame. The frame defines a notch, which notch is bounded by a wall of the frame. The light guide plate includes a side surface, and an ear extending from the side surface. The ear is received in the notch. A first protrusion protrudes from either the wall of the notch or the ear and contacts the corresponding ear or wall of the notch.

Other advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the preferred embodiments in detail.

Figure 1:
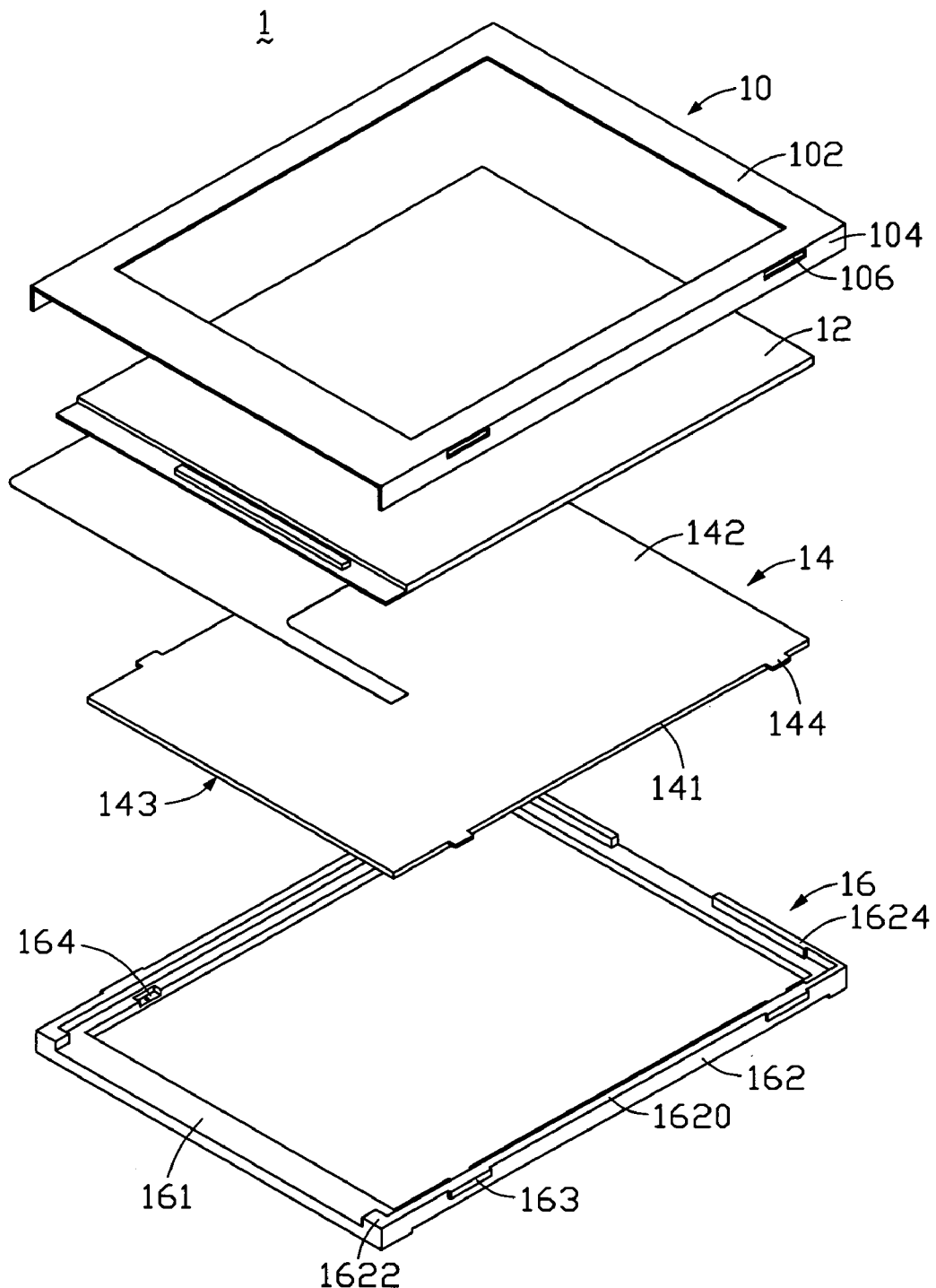
FIG. 1 is an exploded, isometric view of a liquid crystal display including a backlight module according to a first embodiment of the present invention.

Referring to FIG. 1, a liquid crystal display 1 according to a first embodiment of the present invention includes a top bezel 10, a liquid crystal panel 12, a light guide plate 14, and a frame 16, disposed in that order from top to bottom.

The top bezel 10 includes a top wall 102, and two opposite first side walls 104 integrally connecting with the top wall 102. The top wall 102 defines a rectangular first opening (not labeled), corresponding to a display area (not labeled) of the liquid crystal panel 12. The first side walls 104 perpendicularly extend down from opposite long sides (not labeled) of the top wall 102 respectively. Each first side wall 104 defines two hatches 106 therein. The top bezel 10 can be made from iron, aluminum, magnesium, or any other suitable metal or alloy.

Figure 2:
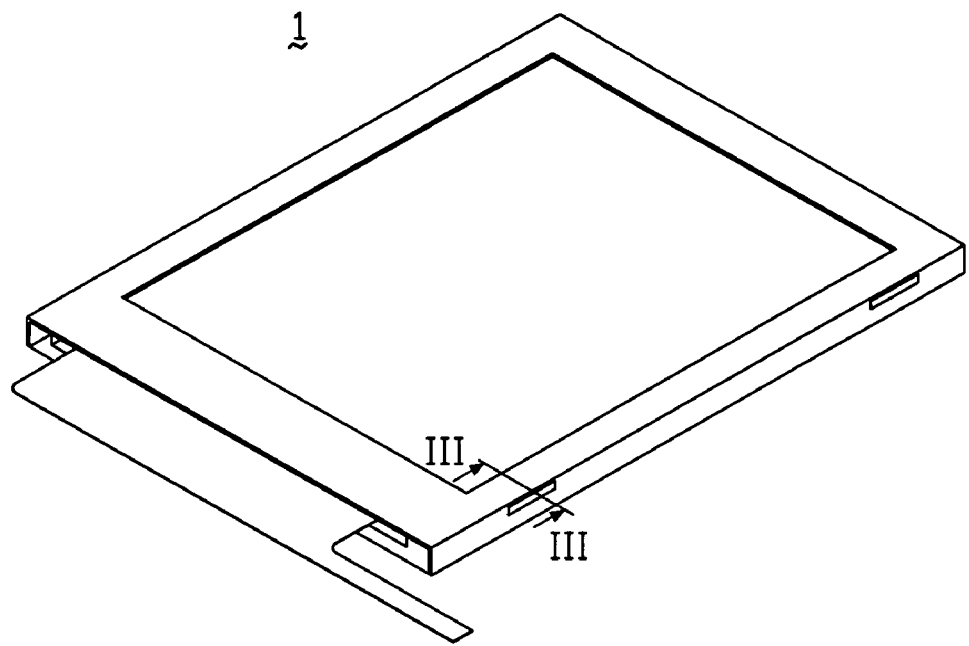
FIG. 2 is an assembled view of the liquid crystal display of FIG. 1.
Figure 3:
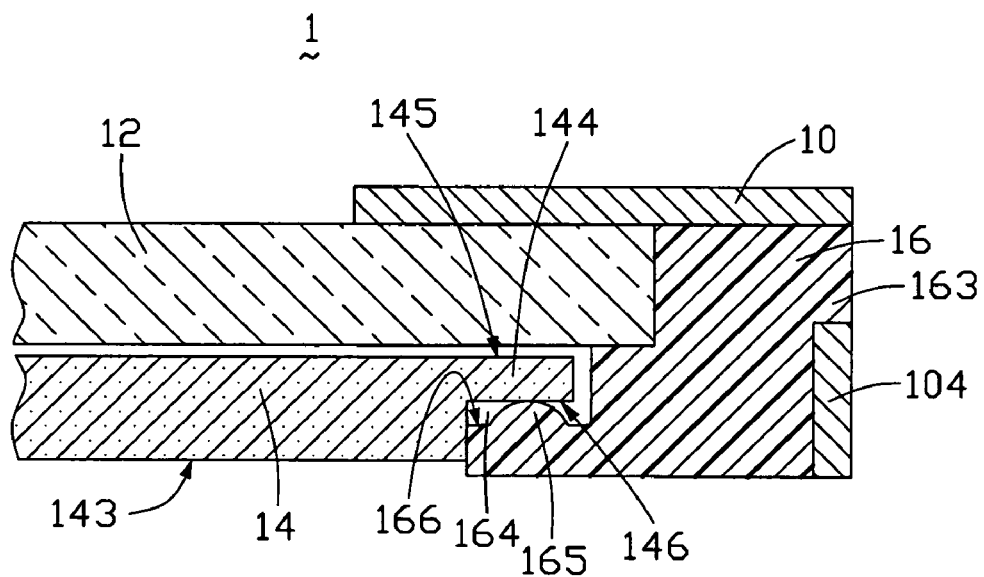
FIG. 3 is an enlarged, cross-sectional view taken along line III-III of FIG. 2.

Referring also to FIG. 2 and FIG. 3, the light guide plate 14 includes two opposite side surfaces 141, a first top surface 142 perpendicularly adjoining the two side surfaces 141, and a first bottom surface 143 opposite to the first top surface 142. Two rectangular first ears 144 integrally extend from each side surface 141. Each first ear 144 includes a second top surface 145, and a second bottom surface 146 opposite to the second top surface 145. The second top surface 145 is coplanar with the first top surface 142. The second bottom surface 146 of the first ear 144 is planar. The first bottom surface 143, the second bottom surface 146, and a side surface (not labeled) adjoining the first bottom surface 143 and the second bottom surface 146 cooperatively define a step. The light guide plate 14 can be made from polycarbonate (PC) or polymethyl methacrylate (PMMA), and can be manufactured by an injection molding method.

The frame 16 includes a bottom wall 161, and two second side walls 162 integrally connecting with the bottom wall 161. The bottom wall 161 is generally frame-shaped, and defines a rectangular second opening (not labeled) for light from below the liquid crystal display 1 to reach the light guide plate 14. Each second side wall 162 has a generally asymmetrical U-shape. The second side walls 162 extend perpendicularly up from two opposite sides (not labeled) of the bottom wall 161, and are symmetrically opposite each other. Outmost vertical faces of the second side walls 162 are coplanar with corresponding outmost vertical faces of the bottom wall 161. Each second side wall 162 includes a first arm 1620, a second arm 1622, and a third arm 1624. Each first arm 1620 extends along a corresponding long side of the frame 16. The corresponding second arm 1622 and third arm 1624 respectively extend perpendicularly inward in a same direction from two opposite ends (not labeled) of the first arm 1620. The third arm 1624 is longer than the second arm 1622. The second arms 1622 of the opposite second side walls 162 are opposite to each other, and the third arms 1624 of the opposite second side walls 162 are opposite to each other. Each first arm 1620 includes two first protrusions 163 integrally extending perpendicularly outward from the outmost vertical face thereof.

The frame 16 further defines two pairs of first notches 164, positioned at two opposite inner long sides (not labeled) of the bottom wall 161 respectively. Each first notch 164 is located opposite to one respective first protrusion 163. Each first ear 144 of the light guide plate 14 is received in one respective first notch 164. A flat third bottom surface 166 that bounds each first notch 164 is parallel to and close to the second bottom surface 146 of the corresponding first ear 144. A plurality of second protrusions 165 (only one shown) integrally protrude from the third bottom surface 166 and contact the second bottom surface 146. The second protrusions 165 can be generally dome shaped or generally linear. Each second protrusion 165 has an arc-shaped cross-sectional configuration; for example, the second protrusion 165 may be hemispherical, sub-hemispherical, semicylindrical, or sub-semicylindrical. The frame 16 is preferably made from plastic or any other suitable polymer.

When the liquid crystal display 1 is assembled, the top bezel 10 and the frame 16 cooperatively accommodate the liquid crystal display 12 and the light guide plate 14 therebetween. The hatches 106 engagingly receive the first protrusions 163 therein, thereby locking the top bezel 10 and the frame 16 together. The first notches 164 of the frame 16 respectively receive the first ears 144 of the light guide plate 14 therein, and the second protrusions 165 at the first notches 164 contact the second bottom surfaces 146 of the first ears 144. Thus, the above-described configuration can help to greatly enhance frictional engagement of the first ears 144 in the first notches 164. That is, there is considerable resistance to relative movement as between the first ears 144 and the frame 16. Therefore the liquid crystal display 1 can avoid being noisy when it is subjected to vibration or shock during operation or transportation.

Figure 4:
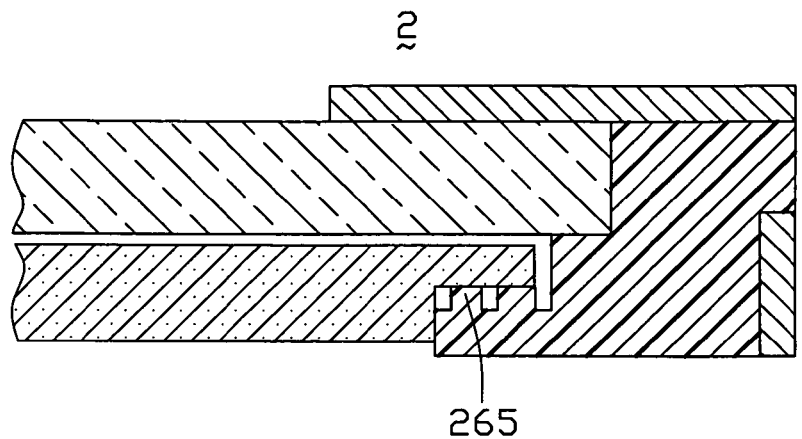
FIG. 4 is similar to FIG. 3, but showing a corresponding view in the case of a liquid crystal display including a backlight module according to a second embodiment of the present invention.

Referring to FIG. 4, a liquid crystal display 2 according to a second embodiment of the present invention is similar to the liquid crystal display 1 of the first embodiment. However, each of third protrusions 165 of the liquid crystal display 2 has a rectangular cross-sectional configuration.

Figure 5:
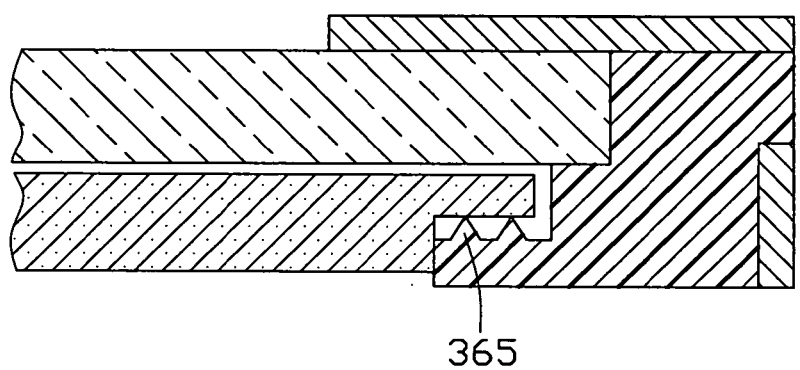
FIG. 5 is similar to FIG. 3, but showing a corresponding view in the case of a liquid crystal display including a backlight module according to a third embodiment of the present invention.

Referring to FIG. 5, a liquid crystal display 3 according to a third embodiment of the present invention is similar to the liquid crystal display 1 of the first embodiment. However, each of fourth protrusions 365 of the liquid crystal display 3 has a triangular cross-sectional configuration.

Figure 6:
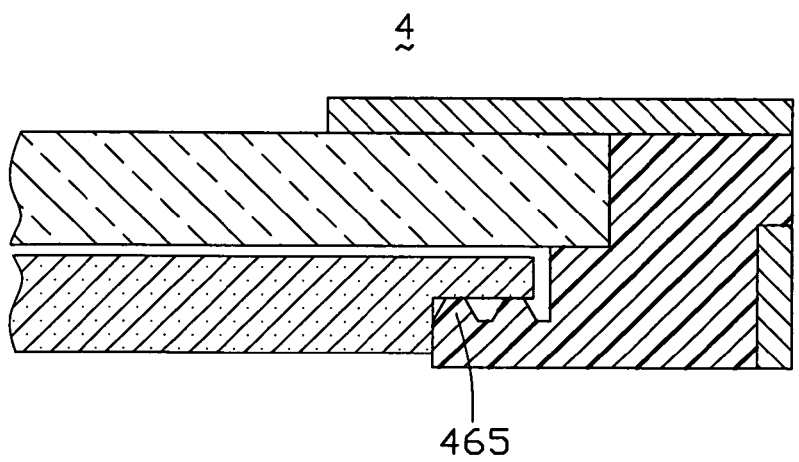
FIG. 6 is similar to FIG. 3, but showing a corresponding view in the case of a liquid crystal display including a backlight module according to a fourth embodiment of the present invention.

Referring to FIG. 6, a liquid crystal display 4 according to a fourth embodiment of the present invention is similar to the liquid crystal display 1 of the first embodiment. However, each of fifth protrusions 465 of the liquid crystal display 4 has a trapezoidal cross-sectional configuration.

Figure 7:
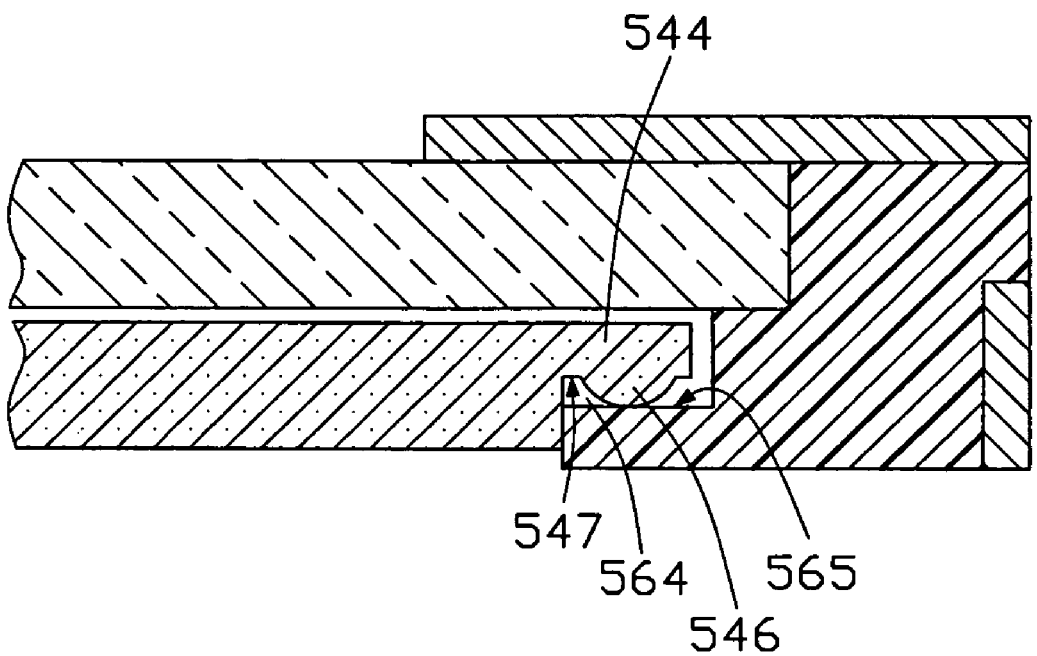
FIG. 7 is similar to FIG. 3, but showing a corresponding view in the case of a liquid crystal display including a backlight module according to a fifth embodiment of the present invention.

Referring to FIG. 7, a liquid crystal display 5 according to a fifth embodiment of the present invention is similar to the liquid crystal display 1 of the first embodiment. However, in the liquid crystal display 5, a fourth bottom surface 565 of each of second notches 564 is planar. A plurality of sixth protrusions (only one shown) 546 integrally protrude from a fifth bottom surface 547 of each of fifth ears 544. The fourth bottom surface 565 at each second notch 564 contacts the sixth protrusions 546 of the corresponding fifth ear 544. The sixth protrusions 546 can be generally dome shaped or generally linear. Each sixth protrusion 546 has an arc-shaped cross-sectional configuration; for example, the sixth protrusion 546 may be hemispherical, sub-hemispherical, semicylindrical, or sub-semicylindrical.

Figure 8:
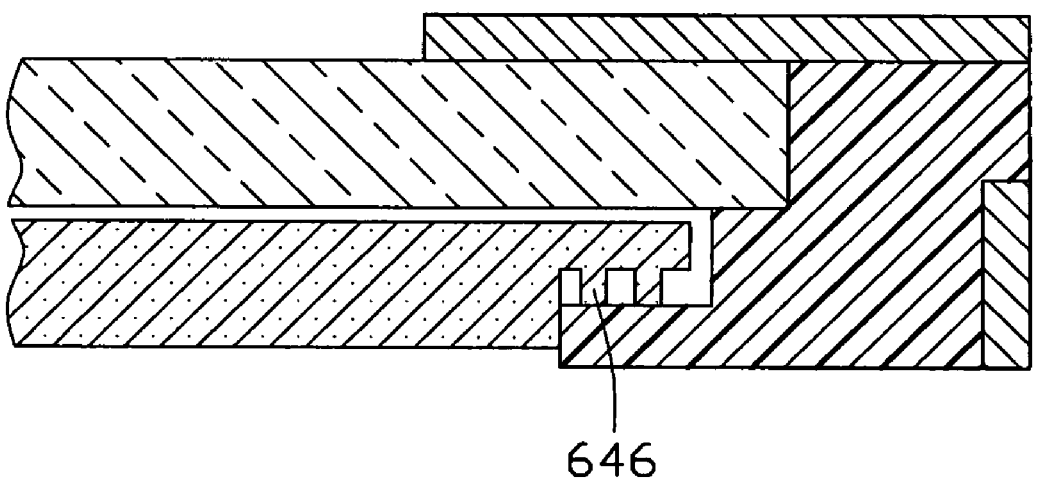
FIG. 8 is similar to FIG. 7, but showing a corresponding view in the case of a liquid crystal display including a backlight module according to a sixth embodiment of the present invention.

Referring to FIG. 8, a liquid crystal display 6 according to a sixth embodiment of the present invention is similar to the liquid crystal display 5 of the fifth embodiment. However, each of seventh protrusions 646 of the liquid crystal display 6 has a rectangular cross-sectional configuration.

Figure 9:
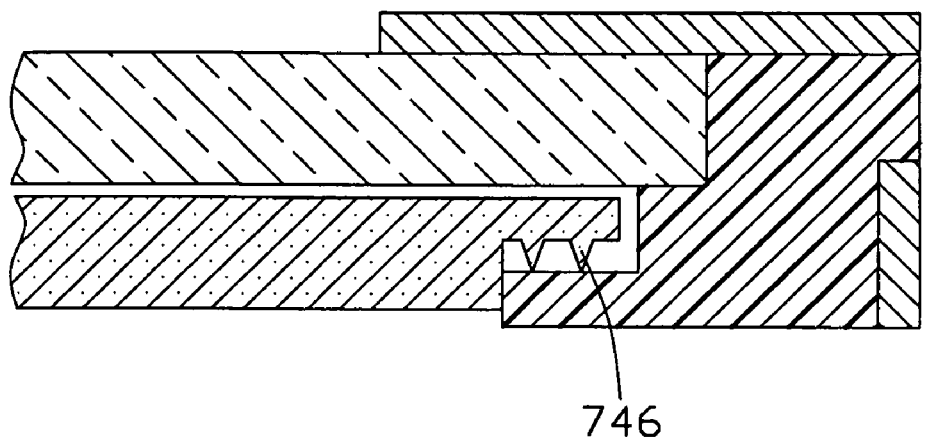
FIG. 9 is similar to FIG. 7, but showing a corresponding view in the case of a liquid crystal display including a backlight module according to a seventh embodiment of the present invention.

Referring to FIG. 9, a liquid crystal display 7 according to a seventh embodiment of the present invention is similar to the liquid crystal display 5 of the fifth embodiment. However, each of eighth protrusions 746 of the liquid crystal display 7 has a triangular cross-sectional configuration.

Figure 10:
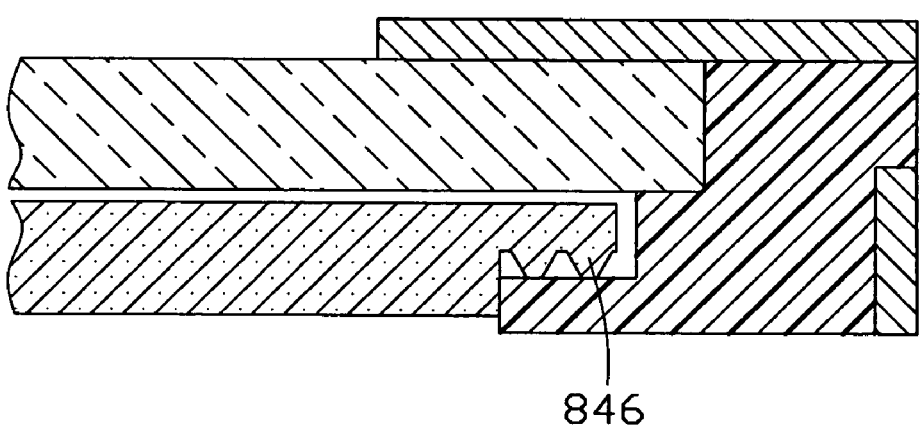
FIG. 10 is similar to FIG. 7, but showing a corresponding view in the case of a liquid crystal display including a backlight module according to an eighth embodiment of the present invention.

Referring to FIG. 10, a liquid crystal display 8 according to an eighth embodiment of the present invention is similar to the liquid crystal display 5 of the fifth embodiment. However, each of ninth protrusions 846 of the liquid crystal display 8 has a trapezoidal cross-sectional configuration.

Further and/or alternative embodiments may include the following. A plurality of generally linear prisms may be defined at the first top surface 142 of the light guide plate 14. A reflective sheet may be disposed adjacent to the first bottom surface 143 of the light guide plate 14. A linear light source or a plurality of point light sources may be disposed adjacent to an underside of the light guide plate 14. In any of the above-described first through fourth embodiments or alternative embodiments, only a single protrusion may be provided at the bottom surface that bounds each notch of the frame. Similarly, in any of the above-described fifth through eighth embodiments or alternative embodiments, only a single protrusion may be provided at the bottom surface of each ear of the light guide plate. In any of the above-described first through eighth embodiments or alternative embodiments, the protrusions may protrude from both the bottom surfaces that bound the notches and from the ears, and frictionally contact each other.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
    a frame defining a notch, wherein the notch is bounded by a wall of the frame; and
    a light guide plate positioned in the frame, the light guide plate comprising:
        a side surface; and
        an ear extending from the side surface, the ear being received in the notch;
    wherein a first protrusion protrudes from either the wall of the notch or the ear and contacts the corresponding ear or wall of the notch,
    the wall of the notch comprises a planar surface contacting the first protrusion of the ear, when the first protrusion is integrally formed with the ear, or the ear comprises a planar surface contacting the first protrusion of the wall of the notch when the first protrusion is integrally formed with the wall of the notch.

2. The backlight module in claim 1, wherein the first protrusion comprises a triangular cross-sectional configuration.

3. The backlight module in claim 1, wherein the first protrusion comprises a rectangular cross-sectional configuration.

4. The backlight module in claim 1, wherein the first protrusion comprises a trapezoidal cross-sectional configuration.

5. The backlight module in claim 3, wherein the first protrusion comprises an arc-shaped cross-sectional configuration.

6. The backlight module in claim 5, wherein the first protrusion is hemispherical, sub-hemispherical, semicylindrical, or sub-semicylindrical.

7. The backlight module in claim 1, wherein the light guide plate further comprises another surface adjacent the side surface.

8. The backlight module in claim 7, wherein the ear comprises a surface coplanar with said another surface of the light guide plate.

9. A backlight module comprising:
a frame defining a notch, wherein the notch is bounded by a wall of the frame;
a light guide plate positioned in the frame, the light guide plate comprising:
a side surface; and
an ear extending from the side surface, the ear being received in the notch;
a first protrusion protruding from either the wall of the notch or the ear and contacts the corresponding ear or wall of the notch, and
a second protrusion protruding from one of the wall of the notch or the ear, whichever one does not have the first protrusion, wherein the second protrusion contacts the first protrusion of the corresponding other of the wall of the notch or the ear.

10. A liquid crystal display comprising:
a liquid crystal panel; and
a backlight module disposed adjacent to the liquid crystal panel, the backlight module comprising:
a frame defining a , wherein the notch is bounded by a wall of the frame; and
a light guide plate positioned in the frame, the light guide plate comprising:
a side surface; and
an ear extending from the side surface, the ear being received in the notch;
wherein a protrusion protrudes from either the wall of the notch or the ear and contacts the corresponding ear or wall of the notch,
the wall of the notch comprises a planar surface contacting the first protrusion of the ear, when the first protrusion is integrally formed with the ear, or the ear comprises a planar surface contacting the first protrusion of the wall of the notch when the first protrusion is integrally formed with the wall of the notch.

* * * * *